United States Patent [19]

Banino

[11] 4,256,501
[45] Mar. 17, 1981

[54] ROCK TREATING METHOD AND COMPOSITIONS

[75] Inventor: George M. Banino, Rexford, N.Y.

[73] Assignee: General Electric Company, Schenectady, N.Y.

[21] Appl. No.: 62,926

[22] Filed: Aug. 2, 1979

[51] Int. Cl.³ ............................................. C04B 7/02
[52] U.S. Cl. ................................... 106/97; 427/221; 428/403; 428/404; 428/407
[58] Field of Search .................. 106/90, 97, 308 M; 427/221; 428/403, 404, 405, 407, 540

[56] References Cited

U.S. PATENT DOCUMENTS

| | | | |
|---|---|---|---|
| 2,967,789 | 1/1961 | Hoyt | 427/221 |
| 3,189,662 | 6/1965 | Vaughn | 260/824 |
| 3,225,495 | 12/1965 | De Vries | 427/221 |
| 3,419,634 | 12/1968 | Vaughn | 260/824 |
| 3,832,419 | 8/1974 | Merritt | 260/824 |

OTHER PUBLICATIONS

A Review of Natural Stone Preservation, NBSIR 74-444, G. A. Sleater, Dec. 1973, Institute for Applied Tech., N.B.S., Wash. D. C. 20234.

*Primary Examiner*—James Poer
*Attorney, Agent, or Firm*—William A. Teoli; James C. Davis, Jr.

[57] ABSTRACT

A method is provided for upgrading rock, for example building block, aggregate, preexisting stone structures, portland cement and bituminous concrete structures to render such rock more resistant to degradation resulting from environmental exposure. An organic condensation polymer containing rock treating composition in the form of a solution or dispersion is also provided based on the use of an organic condensation polymer, such as a silicone-arylpolycarbonate block polymer, an organic aliphatic polyamine and an organic solvent, as well as treated aggregate and improved cement and concrete compositions containing such treated aggregate.

18 Claims, 4 Drawing Figures

ROCK TREATING METHOD AND COMPOSITIONS

CROSS REFERENCE TO RELATED APPLICATIONS

Reference is made to copending application Ser. No. 62,914, filed concurrently herewith, for Donald G. LeGrand, Method of Upgrading Rock and Treated Rock Obtained Therefrom, assigned to the same assignee as the present invention.

BACKGROUND OF THE INVENTION

The present invention relates to a method for improving the resistance of rock to degradation resulting from exposure to adverse elements in the environment, for example, exposure to oxides of sulfur, wet-dry cycles, freeze-thaw cycles, exposure to metallic salts such as sodium chloride, etc. from atmospheric, soil, or other sources. More particularly, an organic condensation polymer composition is provided which can be used to treat the rock to improve its degradation resistance.

Prior to the present invention, various methods were evaluated from treating rock to render the rock more resistant to the effects of atmospheric contamination, wet-dry cycles and freeze-thaw cycles. There have been many studies and methods of improving the quality of building stone and monuments, but only a small amount of study has been related to coarse aggregate quality improvement. Standard engineering tests can be performed to predict the quality of aggregate. One procedure, for example, has been the magnesium or sodium sulfate soundness test, ASTM C88-76. In many instances, local high quality course aggregate is not available for building construction and must be obtained at a high transportation cost. Various procedures have been used in an attempt to improve the quality of marginal or submarginal rock, for example, argillaceous limestone, highly crystalline limestone, graywacke sandstone and other rock types to upgrade such materials for use in portland cement or bituminous concrete. Procedures of the prior art have been found to be unacceptable because of economic reasons, or the treated rock failed to meet the specified percent loss in the magnesium or sodium sulfate soundness test.

STATEMENT OF THE INVENTION

The present invention is based on the discovery that an organic condensation polymer containing composition, or "rock treating composition," resulting from mixing together an organic condensation polymer, for example, an aryl polycarbonate or aryl polycarbonate-silicone block polymer, certain organic aliphatic polyamine, for example, ethylene triamine and an organic solvent, has been found useful as a rock treating composition for imparting spectacular environmental degradation resistance to the rock.

Accordingly, one aspect of the present invention is directed to an organic aryl condensation polymer containing composition which comprises by weight, (A) 1% to 30% of an organic aryl condensation polymer having at least 20 mole percent of chemically combined dioxyarylene units of the formula, $$-ORO-, \quad (1)$$

based on the total moles of intercondensed units,
(B) 0.1% to 10% of an aliphatic polyamine, and
(C) 98.9% to 60% of an organic solvent, based on the weight of (A), (B) and (C),
where R is a divalent $C_{(6-30)}$ arylene radical.

There is also provided by the present invention, a method for upgrading rock to render the rock more resistant to the damaging effects of environmental exposure which comprises (1) wetting the rock with an effective amount of the above described rock treating composition, and (2) allowing or effecting the drying of the resulting treated rock.

Radicals included by R of formula (1) are, for example, aromatic hydrocarbon radicals and halogenated aromatic hydrocarbon radicals, for example, phenylene, tolylene, chlorophenylene, naphthalene, etc., and radicals included by the formula,

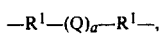

where $R^1$ is a divalent aromatic radical having from 6-13 carbon atoms selected from hydrocarbon radicals and halogenated hydrocarbon radicals, and Q is a divalent organo radical selected from $-C_yH_{2y}-$,

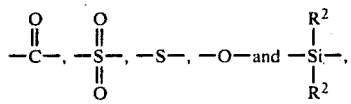

where a is 0 or 1, y is an integer having a value of from 1-5 inclusive, and $R^2$ is a monovalent hydrocarbon radical selected from methyl, phenyl, etc.

Included by the organic aryl condensation polymers, or "condensation polymers," which can be used to make the rock treating compositions of the present invention are reaction products of dihydric phenols of the formula, $$HOROH, \quad (2)$$

where R is as previously defined, with either phosgene, organic dicarboxylic acid halides, organic carbonate esters, etc. There are included poly(carbonateester)-copolymers, polycarbonate imides, etc. The mole percent of fomula (1) units can be 4 to 10 mole percent based on the total moles of intercondensed units. A preferred class of the organic aryl carbonate polymers are the organopolysiloxane-polycarbonate block polymers as defined hereinafter and as shown by Vaughn U.S. Pat. No. 3,189,662 and 3,419,634. Preferably, the organopolysiloxane-polycarbonate block polymer has 10% to 65% by weight of organopolysiloxane based on the weight of block polymer, where the organopolysiloxane blocks have an average size of from about 10 to 100 chemically combined diorganosiloxy units having organo groups selected from methyl or phenyl attached to silicon by carbon-silicon linkages. In addition, there also can be utilized organopolysiloxane-polycarbonate shown by Merritt U.S. Pat. No. 3,821,325 and 3,832,419, assigned to the same assignee as the present invention. Typical of the organopolysiloxane-polycarbonate block polymers utilized in the practice of the present invention are block polymers included within the following formula,

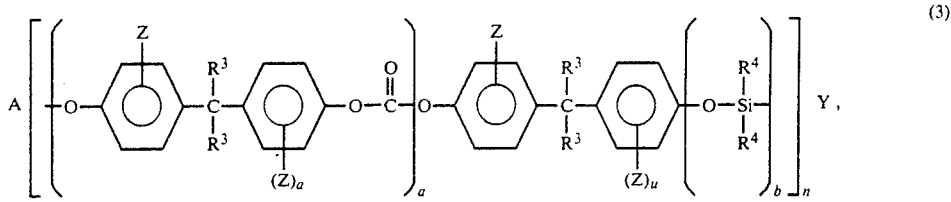

where n is at least 1, and preferably n is an integer equal to from 1 to about 1000 inclusive, a is equal to from 1 to about 200, inclusive, b is equal to from about 5 to about 200, inclusive, and preferably b has an average value of from about 15 to about 90, inclusive, while the ratio of a to b can vary from about 0.5 to about 3, inclusive, and when b has an average value of from about 15 to about 90, inclusive, the ratio of a to b is preferably from about 0.067 to about 0.45, inclusive, u is an integer equal to from about 1 to 4, inclusive, Y is

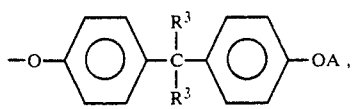

A is a member selected from the class of hydrogen and

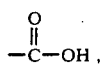

$R^3$ is a member selected from the class of hydrogen, monovalent hydrocarbon radicals and halogenated monovalent hydrocarbon radicals, $R^4$ is a member selected from the class of monovalent hydrocarbon radicals, halogenated monovalent hydrocarbon radicals and cyanoalkyl radicals, and Z is a member selected from the class of hydrogen, lower alkyl radicals and halogen radicals.

Included within the radicals represented by $R^3$ and $R^4$ of formula (3) are $C_{(6-13)}$ radicals and halogenated aryl radicals such as phenyl, chlorophenyl, xylyl, tolyl, naphthyl, etc.; aralkyl radicals such as phenylethyl, benzyl, etc.; aliphatic haloaliphatic and cycloaliphatic radicals such as alkyl, alkenyl, cycloalkyl, haloalkyl including methyl, ethyl, propyl, chlorobutyl, cyclohexyl, etc.; $R^3$ and $R^4$ can be all the same radical or any two or more of the aforementioned radicals, and preferably methyl. In addition to all of the aforementioned $R^4$ also includes cyanoalkyl radicals such as cyanoethyl, cyanobutyl radicals, etc. Radicals that are included within the definition of Z of formula (3) are hydrogen, methyl, ethyl, propyl, chloro, bromo, iodo, etc., and Z is preferably hydrogen.

Aliphatic polyamines which can be utilized in the preparation of the rock treating composition are, for example, diethyltriamine, ethylene diamine, triethylenetetraamine, etc. Additional examples are shown in Kirk-Othmer Encyclopedia of Chemical Technology, Vol. 5, pages 23-24. Organic solvents which can be employed are, for example, acetone, methylene chloride, toluene, etc. In particular instances aqueous dispersions of the rock treating composition having up to 25% by weight of water along with a suitable surfactant have been found effective.

In preparing the above-described rock treating compositions, the various ingredients are simply mixed together and agitated, for example, stirred. The order of addition of the various ingredients is not critical. However, a preferred procedure is to add the aliphatic polyamine to the condensation polymer until at least partial dissolution is achieved. The addition of the organic solvent or organic solvent and water, surfactants, etc., can then be followed to produce a solution or dispersion having at least 1% to 30% by weight of solids based on the total weight of mixture. Preferably, a solution of 70% to 99% by weight of organic solvent is utilized. It has been found that a proportion of 6 parts to 15 parts of the aliphatic polyamine per part of the aryl polycarbonate containing material will provide for effective results. The addition of the organic solvent can thereafter provide the final aryl carbonate containing treating composition within the aforementioned definition.

The term "rock" as employed in the description of the method of the present invention will signify stone, aggregate, block, concrete, etc. More particularly, rock refers to those rocks containing 50% or more of siliceous minerals and those rocks containing 50% or more of carbonate minerals. Siliceous rock is represented, for example, by dark gray, fine-grained graywacke sandstone with interbedded black shale layers and beds. Carbonate rocks are represented, for example, by: medium crystalline metamorphic dolomitic marble; medium to dark gray, fine-grained dolomite to argillaceous dolomite with interbedded black shale partings; and an inter-reef deposit of nearly black, fine grained, argillaceous dolomite to shaly dolomite. In addition to these aggregate rock, those skilled in the art also would know surface or base treatment of existing stone structures, for example, monuments, road surfaces, buildings, etc., having existing shaped stone surfaces also can be benefited and are included within the scope of the present invention. An example of building stone is a fine grained graywacke sandstone which can be medium to dark gray to greenish gray.

DESCRIPTION OF THE DRAWINGS

FIG. 2 shows a slightly inclined screen deck at 20 and a vibrator at 21 to allow for the forward movement of aggregate which is placed on the upper section of the deck 20 and which is allowed to pass under a spray bar at 22 and then discharged at the end of the screen deck into a collection bin, not shown. The treating solution is then collected at the end of the screen deck and recycled to a holding tank 23. It has been found that the total time for treating the aggregate on the screen deck can vary between about 15 seconds to 30 seconds before it is discharged.

Figure 3:
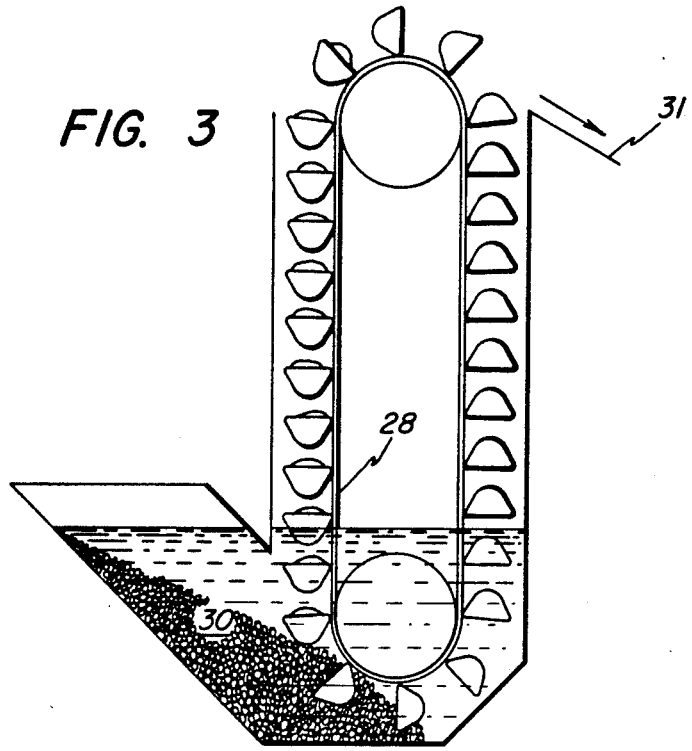

Another variation of aggregate treatment is shown in FIG. 3 utilizing a bucket elevator 28 which is passed through an aggregate bed at 30 which is immersed in treating solution. The treated aggregate is discharged at the top of the elevator at 31. The total aggregate treating time through treating bed averages about 15 seconds to 1 minute.

Figure 4:
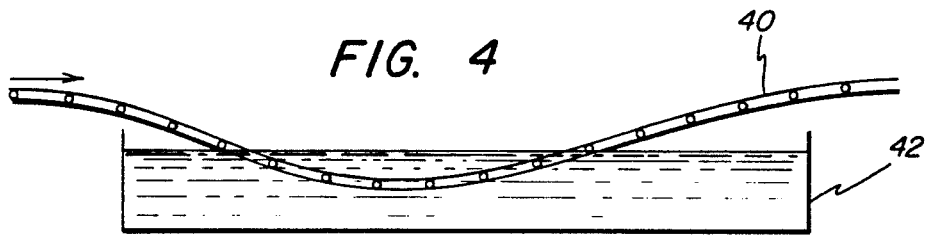

A further variation of treating aggregate in accordance with the practice of the present invention is shown in FIG. 4 showing the immersion of aggregate on a moving conveyer belt 40 through a holding tank 42 containing treating solution. The average treating time in and out of the bath can vary between 15 seconds to one minute depending on various factors such as speed of the conveyer belt, the concentration of the treating solution, etc.

In the practice of the invention, aggregate can be fed into the treating solution and the treated aggregate can thereafter be allowed to dry. As previously indicated, the time for treating the aggregate can vary widely for effective results. Experience has shown that a solids concentration of between about 2 to 25% will provide effective results in the treating bath. Higher or lower concentrations can also be utilized, however, those skilled in the art would know that longer contact times, or waste of aryl polycarbonate containing material might readily result rendering the procedures uneconomic.

In particular instances, heated forced air which can be used to effect the drying of the treated rock.

The test method used to evaluate rock treated in accordance with the practice of the present invention is the sulfate soundness test. More specifically, the rock was tested in accordance with New York State Department of Transportation "Soundness of Course Aggregates by Magnesium Sulfate Solutions," test method New York 207 B-76. This test is based on the ASTM soundness of aggregates by use of sodium sulfate or magnesium sulfate test method C88-76. The New York State test method maintains a solution temperature of 74° plus or minus 1° F., while the ASTM method maintains a solution temperature of 70° F. plus or minus 1° F. The other significant distinction between the two test methods is that the New York State test method is based on a 10 cycle test while the ASTM test is run on a 5 cycle test. Accordingly, the New York State test is a more severe test.

The term aggregate as utilized in the practice of the invention includes crushed stone and gravel which can vary in size from approximately ¼" to 4" in diameter. Preferably, aggregate can vary in size from ¼" to 1½". Aggregate utilized in the test method for evaluation was initially screened to separate out the fraction passing a ½ inch screen retained on a ¼" screen. The sized aggregate was then washed to remove any dust or coatings. The washed aggregate was then dried in an oven to a constant weight at a temperature of 230° F. plus or minus 9° F. The dried sample was then weighed to obtain a 2500 gram plus or minus 50 gram charge.

The dried aggregate was then placed into a wire mesh basket and immersed into the treating composition for about 30 seconds to 1 minute and agitated slightly to displace any air pockets. The basket was then removed from the solution of the composition and allowed to set for several minutes until little or no solution runoff was observed. The treated sample was then dried in an oven at a temperature of 230° F. plus or minus 9° F. to a constant weight.

The treated sample was then tested for its ability to resist environmental degradation by immersing it while in a wire basket into a magnesium sulfate solution for 16-18 hours. After immersion, the sample was removed and allowed to drain for about 15 minutes and then placed into a drying oven which was at a temperature of 230° F. plus or minus 9° F. The sample was then dried for about 6½ hours, completing one cycle. The process of alternate immersion and drying was repeated for 10 full cycles.

After completing the final cycle, the sample was washed free of any magnesium sulfate and then dried to a constant weight in a drying oven at a temperature of 290° F. plus or minus 9° F. The dried aggregate was then resieved over a ¼ inch sieve and the weight recorded. The difference between the final weight and the original weight represents the loss due to "D" or "degradation". The %D is expressed as a percentage of the original weight.

In instances where blocks of stone were tested, a modification of the above-described aggregate test procedure was employed. Approximately cubical shaped blocks ranging from about 1½ inch to 3 inches on a side were separated from larger blocks either by sawing or by breaking the rock with a hammer and chisel. The blocks were then either soaked in the test solution for up to one minute, or coated with the solution using a paint brush. The blocks were then placed in an oven at a temperature of 230° F. plus or minus 9° F. to a constant weight. The prepared samples were then subjected to alternate immersion and drying for 10 cycles in the same manner as described above for the aggregate. Upon completion of the final cycle, the blocks were then washed free of magnesium sulfate and the %D was observed quantitatively in terms of percent weight loss based on the original weight of sample.

In order that those skilled in the art will be better able to practice the invention, the following Examples are given by way of illustration and not by way of limitation. All parts are by weight.

EXAMPLE 1.

A rock treating composition was prepared by blending together for 5 to 60 minutes at 25° C. with stirring, a polydimethylsiloxane-bisphenol-A-polycarbonate block polymer, and diethylenetriamine, and thereafter dissolving the resulting mixture in acetone. There was obtained an aryl carbonate treating composition which was based on the use of about 6.5% by weight of a diethylene triamine, 19% by weight of the silicone-polycarbonate block polymer and about 74.5% by weight of acetone.

The silicone-polycarbonate block polymer utilized in the above silicone treating composition was more particularly a block polymer containing about 43% by weight of polydimethylsiloxy units, based on the total weight of polydimethylsiloxane-polycarbonate block polymer. The block polymer consisted essentially of silicone blocks joined to polycarbonate blocks by silicon-oxygen-carbon linkages.

Various aggregate samples in the form of argillaceous limestone or dolomite, marbilized limestone or metamorphic dolomitic marble and silty sandstone or grawacke sandstone were treated with the aryl carbonate treating composition in accordance with the previously described test procedure to evaluate their ability to resist degradation in accordance with test method New York 207 B-76, as previously described. The following results were obtained, where the values shown indicate %D or weight loss experienced by the aggregate as a result of successive immersions in $MgSO_4$ followed by a washing and drying cycle.

TABLE I

| Rock Type | Treated | Untreated |
| --- | --- | --- |
| Argillaceous Limestone | 2.16 | 50.90 |
| Argillaceous Limestone | 2.16 | 72.43 |
| Argillaceous Limestone | 1.19 | — |
| Marbilized Limestone | 1.86 | 65.16 |
| Silty Sandstone | 1.61 | 43.36 |

The above results show that the method of the present invention provides significant environmental protection for aggregate of various description to resist degradation.

Figure 1:
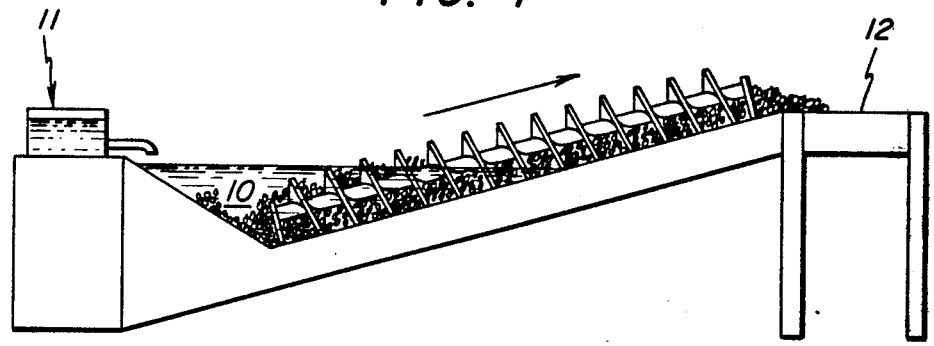
FIGS. 1-4 are diagrammatic views showing various procedures of treating aggregate in accordance with the practice of the present invention. More particularly, in FIG. 1, there is shown an inclined spiral screw assembly extending into a well at 10. Aggregate feed is fed into the well at 10 and aryl polycarbonate containing material or "treating solution" is fed into the same location from a reservoir at 11 to produce an aggregate bed immersed in treating solution. The spiral screw is thereinafter rotated to convey the aggregate up an incline to a discharge point at 12 and the treated aggregate is then conveyed to a collection point, not shown, and allowed to dry under atmospheric conditions. Total treating time, that is time in which the aggregate is fed into the treating solution until it is discharged, can vary from 15 seconds to 90 seconds.
Figure 2:
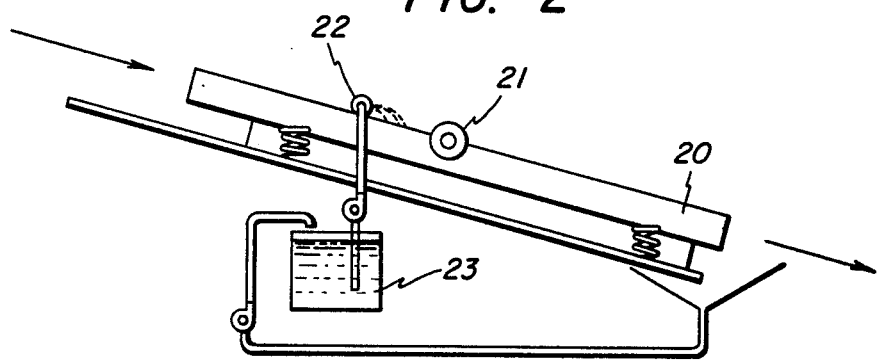

In a further aspect of the invention, argillaceous limestone aggregate is fed into a treating bath of the above-described aryl carbonate containing treating composition and then fed up a conveyor employing a screw conveyor, as shown in FIG. 1. The treated aggregate is discharged within 90 seconds after being introduced into the aryl carbonate treating bath. The treated aggregate is then collected in a hopper and allowed to air dry approximately 15 minutes. The treated aggregate is then blended with sand and portland cement to produce concrete having approximately 45% by weight of coarse aggregate treated in accordance with the present invention. Additional concrete compositions also can be made utilizing the treated aggregate having from 30% by weight to 60% by weight of the treated aggregate. Further examples of cement and concrete mixtures which can be used in combination with treated aggregate of the present invention are shown in the Encyclopedia of Chemical Technology (1979) Vol. 5, pages 163-191, John Wiley and Sons, New York.

EXAMPLE 2.

Additional aryl carbonate treating compositions were prepared utilizing acetone as the solvent. A composition free of aryl carbonate and containing a polydimethylsiloxane fluid and diphenylcarbonate were also evaluated as possible candidates for preparing rock treating compositions. In addition to diethylenediamine, propylamine, dipropylamine and ethylenediamine were also evaluated as an aliphatic amine source. The proportions of aliphatic amine to aryl carbonate containing material or silicone fluid was approximately the same proportion as used in Example 1. Marble was utilized as the aggregate source which was treated and tested under New York 207 B-76 as described above. The following results were obtained, where the concentration is shown as grams of solid per deciliter, "DETA" is diethylenetriamine, block polymer is the silicone-polycarbonate block polymer of Example 1, and polycarbonate is Lexan polycarbonate manufactured by the General Electric Company.

TABLE II

| Mixture | Concentration (gm/dl) | % D |
| --- | --- | --- |
| Control | — | 19.29 |
| DETA | 3 | 18.7 |
| DETA, polycarbonate | 3.0 | 6.65 |
| DETA, polycarbonate | 1.0 | 21.34 |
| DETA, block polymer | 3.0 | 4.16 |
| DETA, block polymer | 1.0 | 33.32 |
| DETA, silicone fluid | 3.0 | 15.15 |
| DETA, silicone fluid | 1.0 | 11.75 |
| Propylamine/polycarbonate | 3 | 34.2 |
| Ethylenediamine/polycarbonate | 3 | 4.84 |
| Dipropylamine/polycarbonate | 3 | 10.4 |
| DETA/Diphenyl carbonate | 3 | 10.4 |

The above results show that the aryl carbonate treating composition of the present invention imparts improved environmental degradation resistance to limestone aggregate and marble aggregate. The silicone fluid and aliphatic monoamine mixture are less effective than the aryl carbonate containing mixture having the aliphatic polyamine.

Additional aryl carbonate treating compositions were prepared using methylene chloride as the solvent. The following results were obtained:

TABLE III

| Mixture | Concentration (gm/dl) | % D |
| --- | --- | --- |
| DETA, block polymer | 3.0 | 3.81 |
| DETA, polycarbonate | 3.0 | 2.88 |
| DETA/Diphenyl/carbonate | 3.0 | 19.2 |

EXAMPLE 3.

The procedure of Example 2 was repeated, except that in place of the arylcarbonate treating composition there was utilized polyethyleneterephthalate manufactured by E. I. DuPont de Nemours and Company having a molecular weight of about 20,000 and Rucoflex S-1052 (an aliphatic polyester) manufactured by the Hooker Chemical Company. Dolomite aggregate was utilized which was treated and tested with the aforementioned polyester compositions in combination with DETA and acetone and the %D was determined in accordance with New York 207 B-76. The following results were obtained, where PET is the polyethyleneterephthalate and aliphatic is the Rucoflex S-1052:

TABLE IV

| Polyester | Conc. (gm/dl) | % D |
| --- | --- | --- |
|  | 0 | 36.6 |
| PET | 3.0 | 14.6 |
| aliphatic | 3.0 | 20.5 |

Although the above examples are directed to only a few of the very many variables within the scope of the present invention, it should be understood that the present invention is directed to a much broader class of rock treating compositions based on the use of various organic condensation polymers shown in the description proceding these examples.

What I claim as new and desire to secure by Letters Patent of the United States is:

1. A rock treating composition comprising by weight
   (A) 1% to 30% of an organic aryl condensation polymer having at least 20 mole percent of chemically combined dioxyarylene units of the formula,

—ORO—, based on the total moles of intercondensed units,
   (B) 0.1% to 10% of an aliphatic polyamine, and
   (C) 98.9% to 60% of an organic solvent, based on the total weight of (A), (B) and (C),
   where R is a divalent $C_{(6-30)}$ arylene radical.

2. A rock treating composition in accordance with claim 1, where R is

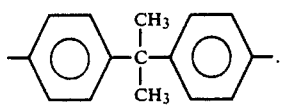

3. A rock treating composition in accordance with claim 1, where the aliphatic polyamine is ethylene triamine.

4. A rock treating composition in accordance with claim 1, where the organic solvent is acetone.

5. A rock treating composition in accordance with claim 1, where the aryl condensation polymer is a silicone-polycarbonate block polymer.

6. A rock treating composition in accordance with claim 1, where the aryl condensation polymer is a polycarbonate.

7. A rock treating composition in accordance with claim 1, where the aryl condensation polymer is a polyester.

8. A rock treating composition in accordance with claim 1 in the form of an aqueous-organic solvent dispersion.

9. A method of treating stone to increase its resistance to environmental degradation which comprises,
   (1) wetting the stone with a rock treating composition and
   (2) allowing or effecting the drying of the resulting treated stone, where the rock treating composition is a mixture comprising by weight
   (A) 1% to 30% of an organic aryl condensation polymer having at least 20 mole percent of chemically combined dioxyarylene unis of the formula,

—ORO—, based on the total moles of the intercondensed units,
   (B) 0.1% to 10% of an aliphatic polyamine, and
   (C) 98.9% to 60% of an organic solvent, based on the total weight of (A), (B) and (C),
   where R is a divalent $C_{(6-30)}$ arylene radical.

10. A method in accordance with claim 9, where the stone is aggregate.

11. A method in accordance with claim 9, where the stone is a shaped rock or a concrete structure.

12. Treated aggregate made in accordance with the method of claim 9.

13. A concrete mixture comprising portland cement and at least 30% by weight of aggregate treated with a composition comprising by weight
    (A) 1% to 30% of an organic aryl condensation polymer having at least 20 mole percent of chemically combined dioxyarylene units of the formula,

—ORO—, based on the total moles of the intercondensed units,
    (B) 0.1% to 10% of an aliphatic polyamine, and
    (C) 98.9% to 60% of an organic solvent,
    based on the total weight of (A), (B) and (C),
    where R is a divalent $C_{(6-30)}$ arylene radical.

14. A method in accordance with claim 9, where R is

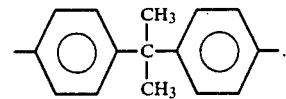

15. A method in accordance with claim 9, where the aliphatic polyamine is ethylene triamine.

16. A method in accordance with claim 9, where the aryl condensation polymer is a silicone-polycarbonate block polymer.

17. A method in accordance with claim 9, where the arylcondensation polymer is polycarbonate.

18. A method in accordance with claim 9, where the organic solvent is acetone.

* * * * *